United States Patent
Mahan et al.

(10) Patent No.: US 9,183,607 B1
(45) Date of Patent: Nov. 10, 2015

(54) SCOREBOARD CACHE COHERENCE IN A GRAPHICS PIPELINE

(75) Inventors: Justin M. Mahan, Fremont, CA (US); Edward A. Hutchins, Mountain View, CA (US); Kevin P. Acken, Mountain View, CA (US); Michael J. M. Toksvig, Palo Alto, CA (US); Christopher D. S. Donham, San Mateo, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1268 days.

(21) Appl. No.: 11/893,431

(22) Filed: Aug. 15, 2007

(51) Int. Cl.
| | |
|---|---|
| *G06T 1/20* | (2006.01) |
| *G06T 1/00* | (2006.01) |
| *G06F 15/00* | (2006.01) |
| *G06T 15/00* | (2011.01) |

(52) U.S. Cl.
CPC ............... *G06T 1/20* (2013.01); *G06T 15/005* (2013.01)

(58) Field of Classification Search
CPC ................................ G06T 1/20; G06T 15/005
USPC .................................................. 345/506, 501
See application file for complete search history.

(56) References Cited

U.S. PATENT DOCUMENTS

| | | | |
|---|---|---|---|
| 4,620,217 A | 10/1986 | Songer | |
| 4,648,045 A | 3/1987 | Demetrescu | |
| 4,700,319 A | 10/1987 | Steiner | |
| 4,862,392 A | 8/1989 | Steiner | |
| 4,901,224 A | 2/1990 | Ewert | |
| 5,185,856 A | 2/1993 | Alcorn et al. | |
| 5,268,995 A | 12/1993 | Diefendorff et al. | |
| 5,285,323 A | 2/1994 | Hetherington et al. | |
| 5,357,604 A | 10/1994 | San et al. | |
| 5,392,393 A | 2/1995 | Deering | |
| 5,487,022 A | 1/1996 | Simpson et al. | |
| 5,488,687 A | 1/1996 | Rich | |
| 5,491,496 A | 2/1996 | Tomiyasu | |
| 5,577,213 A | 11/1996 | Avery et al. | |

(Continued)

FOREIGN PATENT DOCUMENTS

| | | |
|---|---|---|
| CN | 1954338 | 5/2004 |
| CN | 101091203 | 5/2004 |

(Continued)

OTHER PUBLICATIONS

"Interleaved Memory." Dec. 26, 2002. http://www.webopedia.com/TERM/1/interleaved_memory.html.

(Continued)

*Primary Examiner* — Zhengxi Liu (57) ABSTRACT

A method in system for latency buffered scoreboarding in a graphics pipeline of a graphics processor. The method includes receiving a graphics primitive for rasterization in a raster stage of a graphics processor and rasterizing the graphics primitive to generate a plurality pixels related to the graphics primitive. An ID stored to account for an initiation of parameter evaluation for each of the plurality of pixels as the pixels are transmitted to a subsequent stage of the graphics processor. A buffer is used to store the fragment data resulting from the parameter evaluation for each of the plurality of pixels by the subsequent stage. The ID and the fragment data from the buffering are compared to determine whether they correspond to one another. The completion of parameter evaluation for each of the plurality of pixels is accounted for when the ID and the fragment data match and as the fragment data is written to a memory.

21 Claims, 7 Drawing Sheets

(56) References Cited

U.S. PATENT DOCUMENTS

| | | | |
|---|---|---|---|
| 5,579,473 A | 11/1996 | Schlapp et al. | |
| 5,579,476 A | 11/1996 | Cheng et al. | |
| 5,581,721 A | 12/1996 | Wada et al. | |
| 5,600,584 A | 2/1997 | Schlafly | |
| 5,604,824 A | 2/1997 | Chui et al. | |
| 5,613,050 A | 3/1997 | Hochmuth et al. | |
| 5,655,132 A | 8/1997 | Watson | |
| 5,701,444 A | 12/1997 | Baldwin | |
| 5,764,228 A * | 6/1998 | Baldwin | 715/797 |
| 5,777,628 A | 7/1998 | Buck-Gengler | |
| 5,831,640 A | 11/1998 | Wang et al. | |
| 5,850,572 A | 12/1998 | Dierke | |
| 5,864,342 A | 1/1999 | Kajiya et al. | |
| 5,941,940 A | 8/1999 | Prasad et al. | |
| 5,995,121 A | 11/1999 | Alcorn et al. | |
| 6,115,047 A * | 9/2000 | Deering | 345/422 |
| 6,166,743 A | 12/2000 | Tanaka | |
| 6,173,366 B1 | 1/2001 | Thayer et al. | |
| 6,222,550 B1 | 4/2001 | Rosman et al. | |
| 6,229,553 B1 | 5/2001 | Duluk, Jr. et al. | |
| 6,259,460 B1 | 7/2001 | Gossett et al. | |
| 6,288,730 B1 | 9/2001 | Duluk, Jr. et al. | |
| 6,333,744 B1 | 12/2001 | Kirk et al. | |
| 6,351,806 B1 | 2/2002 | Wyland | |
| 6,353,439 B1 | 3/2002 | Lindholm et al. | |
| 6,407,740 B1 | 6/2002 | Chan | |
| 6,411,130 B1 | 6/2002 | Gater | |
| 6,411,301 B1 | 6/2002 | Parikh et al. | |
| 6,417,851 B1 | 7/2002 | Lindholm et al. | |
| 6,466,222 B1 | 10/2002 | Kao et al. | |
| 6,483,516 B1 * | 11/2002 | Tischler | 345/552 |
| 6,496,537 B1 | 12/2002 | Kranawetter et al. | |
| 6,525,737 B1 | 2/2003 | Duluk, Jr. et al. | |
| 6,526,430 B1 | 2/2003 | Hung et al. | |
| 6,542,971 B1 | 4/2003 | Reed | |
| 6,557,022 B1 | 4/2003 | Sih et al. | |
| 6,597,363 B1 | 7/2003 | Duluk, Jr. et al. | |
| 6,604,188 B1 | 8/2003 | Coon et al. | |
| 6,624,818 B1 | 9/2003 | Mantor et al. | |
| 6,636,221 B1 | 10/2003 | Morein | |
| 6,664,958 B1 | 12/2003 | Leather et al. | |
| 6,717,577 B1 | 4/2004 | Cheng et al. | |
| 6,718,542 B1 | 4/2004 | Kosche et al. | |
| 6,731,288 B2 | 5/2004 | Parsons et al. | |
| 6,734,861 B1 | 5/2004 | Van Dyke et al. | |
| 6,778,181 B1 | 8/2004 | Kilgariff et al. | |
| 6,806,886 B1 | 10/2004 | Zatz | |
| 6,839,828 B2 | 1/2005 | Gschwind et al. | |
| 6,924,808 B2 | 8/2005 | Kurihara et al. | |
| 6,947,053 B2 | 9/2005 | Malka et al. | |
| 6,980,209 B1 | 12/2005 | Donham et al. | |
| 6,980,222 B2 | 12/2005 | Marion et al. | |
| 6,992,669 B2 * | 1/2006 | Montrym et al. | 345/427 |
| 6,999,100 B1 | 2/2006 | Leather et al. | |
| 7,015,913 B1 * | 3/2006 | Lindholm et al. | 345/501 |
| 7,034,828 B1 | 4/2006 | Drebin et al. | |
| 7,079,156 B1 * | 7/2006 | Hutchins et al. | 345/606 |
| 7,106,336 B1 * | 9/2006 | Hutchins | 345/530 |
| 7,158,141 B2 | 1/2007 | Chung et al. | |
| 7,187,383 B2 | 3/2007 | Kent | |
| 7,190,366 B2 * | 3/2007 | Hutchins et al. | 345/505 |
| 7,257,814 B1 | 8/2007 | Melvin et al. | |
| 7,280,112 B1 | 10/2007 | Hutchins | |
| 7,298,375 B1 | 11/2007 | Hutchins | |
| 7,450,120 B1 | 11/2008 | Hakura et al. | |
| 7,477,260 B1 | 1/2009 | Nordquist | |
| 7,659,909 B1 | 2/2010 | Hutchins | |
| 7,710,427 B1 | 5/2010 | Hutchins et al. | |
| 7,928,990 B2 | 4/2011 | Jiao et al. | |
| 7,941,645 B1 | 5/2011 | Riach et al. | |
| 7,969,446 B2 | 6/2011 | Hutchins et al. | |
| 8,537,168 B1 | 9/2013 | Steiner et al. | |
| 8,773,447 B1 | 7/2014 | Donham | |
| 8,860,722 B2 | 10/2014 | Cabral et al. | |
| 2002/0105519 A1 | 8/2002 | Lindholm et al. | |
| 2002/0126126 A1 | 9/2002 | Baldwin | |
| 2002/0129223 A1 | 9/2002 | Takayama et al. | |
| 2002/0169942 A1 | 11/2002 | Sugimoto | |
| 2003/0038810 A1 * | 2/2003 | Emberling | 345/540 |
| 2003/0115233 A1 | 6/2003 | Hou et al. | |
| 2003/0164840 A1 * | 9/2003 | O'Driscoll | 345/611 |
| 2003/0189565 A1 | 10/2003 | Lindholm et al. | |
| 2004/0012597 A1 | 1/2004 | Zatz et al. | |
| 2004/0012599 A1 | 1/2004 | Laws | |
| 2004/0012600 A1 | 1/2004 | Deering et al. | |
| 2004/0024260 A1 | 2/2004 | Winkler et al. | |
| 2004/0100474 A1 | 5/2004 | Demers et al. | |
| 2004/0114813 A1 | 6/2004 | Boliek et al. | |
| 2004/0119710 A1 * | 6/2004 | Piazza et al. | 345/422 |
| 2004/0126035 A1 | 7/2004 | Kyo | |
| 2004/0130552 A1 | 7/2004 | Duluk, Jr. et al. | |
| 2004/0246260 A1 | 12/2004 | Kim et al. | |
| 2005/0122330 A1 | 6/2005 | Boyd et al. | |
| 2005/0134588 A1 | 6/2005 | Aila et al. | |
| 2005/0135433 A1 | 6/2005 | Chang et al. | |
| 2005/0162436 A1 | 7/2005 | Van Hook et al. | |
| 2005/0223195 A1 | 10/2005 | Kawaguchi | |
| 2005/0231506 A1 | 10/2005 | Simpson et al. | |
| 2005/0237337 A1 | 10/2005 | Leather et al. | |
| 2005/0253873 A1 * | 11/2005 | Hutchins et al. | 345/660 |
| 2005/0275657 A1 * | 12/2005 | Hutchins et al. | 345/506 |
| 2005/0280655 A1 | 12/2005 | Hutchins et al. | |
| 2006/0007234 A1 | 1/2006 | Hutchins et al. | |
| 2006/0028469 A1 | 2/2006 | Engel | |
| 2006/0152519 A1 | 7/2006 | Hutchins et al. | |
| 2006/0155964 A1 | 7/2006 | Totsuka | |
| 2006/0177122 A1 | 8/2006 | Yasue | |
| 2006/0268005 A1 * | 11/2006 | Hutchins et al. | 345/606 |
| 2006/0288195 A1 | 12/2006 | Ma et al. | |
| 2007/0030278 A1 | 2/2007 | Prokopenko et al. | |
| 2007/0165029 A1 | 7/2007 | Lee et al. | |
| 2007/0236495 A1 | 10/2007 | Gruber et al. | |
| 2007/0279408 A1 | 12/2007 | Zheng et al. | |
| 2007/0285427 A1 | 12/2007 | Morein et al. | |

FOREIGN PATENT DOCUMENTS

| | | |
|---|---|---|
| EP | 1665165 | 5/2004 |
| EP | 1745434 | 5/2004 |
| EP | 1771824 | 5/2004 |
| JP | 05150979 A2 | 6/1993 |
| JP | 11053187 A2 | 2/1999 |
| JP | 2000047872 A2 | 2/2000 |
| JP | 2002073330 A2 | 3/2002 |
| JP | 2002171401 | 6/2002 |
| JP | 2004199222 | 7/2004 |
| JP | 2006196004 | 7/2006 |
| JP | 2008161169 | 7/2008 |
| WO | 2005112592 | 5/2004 |
| WO | 2006007127 | 5/2004 |
| WO | 2005114582 | 12/2005 |
| WO | 2005114646 | 12/2005 |

OTHER PUBLICATIONS

Pirazzi, Chris. "Fields, F1/F2, Interleave, Field Dominance and More." Nov. 4, 2001. http://lurkertech.com/lg/dominance.html.

Hennessy, et al., Computer Organization and Design: the Hardware/Software Interface, 1997, Section 6.5.

Moller, et al.; Real-Time Rendering, 2nd ed., 2002, A K Peters Ltd., pp. 92-99, 2002.

Hollasch; IEEE Standard 754 Floating Point Numbers; http://steve.hollasch.net/cgindex/coding/ieeefloat.html; dated Feb. 24, 2005; retrieved Oct. 21, 2010.

Microsoft; (Complete) Tutorial to Understand IEEE Floating-Point Errors; http://support.microsoft.com/kb/42980; dated Aug. 16, 2005; retrieved Oct. 21, 2010.

The Free Online Dictionary, Thesaurus and Encyclopedia, definition for cache; http://www.thefreedictionary.com/ cache; retrieved Aug. 17, 2012.

Wolfe A, et al., "A Superscalar 3D graphics engine", MICRO-32. Proceedings of the 32nd annual ACM/IEEE International Symposium on Microarchitecture. Haifa, Israel, Nov. 16-18, 1999;.

(56) References Cited

OTHER PUBLICATIONS

Zaharieva-Stoyanova E I: "Data-flow analysis in superscalar computer architecture execution," Tellecommunications in Modern Satellite, Cable and Broadcasting Services, 2003.

"Sideband," http://www.encyclopedia.com/html/s1/sideband.asp.

Pixar, Inc.; PhotoRealistic RenderMan 3.9 Shading Language Extensions; Sep. 1999.

PCT Notificaiton of Transmittal of the International Search Report and the Written Opinion of the International Searching Authority, or the Declaration. PCT/US05/17032; Applicant NVIDA Corporation; Mail Date Nov. 9, 2005.

PCT Notificaiton of Transmittal of the International Search Report or the Declaration. PCT/US05/17526; Applicant Hutchins, Edward A; Mail Date Jan. 17, 2006.

PCT Notificaiton of Transmittal of the International Search Report and the Written Opinion of the International.

\* cited by examiner

SCOREBOARD CACHE COHERENCE IN A GRAPHICS PIPELINE

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives and produce real-time rendered 3-D images.

The real-time rendered 3-D images are generated using rasterization technology. Rasterization technology is widely used in computer graphics systems, and generally refers to the mechanism by which the grid of multiple pixels comprising an image are influenced by the graphics primitives. For each primitive, a typical rasterization system steps from pixel to pixel and determines whether or not to "render" (write a given pixel into a frame buffer or pixel map) as per the contribution of the primitive. This, in turn, determines how to write the data to the display buffer representing each pixel.

Various traversal algorithms and various rasterization methods have been developed for computing all of the pixels covered by the primitive(s) comprising a given 3-D scene. For example, some solutions involve generating the pixels in a unidirectional manner. Such traditional unidirectional solutions involve generating the pixels row-by-row in a constant direction (e.g. left to right). The coverage for each pixel is evaluated to determine if the pixel is inside the primitive being rasterized. This requires that the sequence shift across the primitive to a starting location on a first side of the primitive upon finishing at a location on an opposite side of the primitive.

Other traditional methods involve stepping pixels in a local region following a space filling curve such as a Hilbert curve. The coverage for each pixel is evaluated to determine if the pixel is inside the primitive being rasterized. This technique does not have the large shifts (which can cause inefficiency in the system) of the unidirectional solutions, but is typically more complicated to design than the unidirectional solution.

Once the primitives are rasterized into their constituent pixels, these pixels are then processed in pipeline stages subsequent to the rasterization stage where the rendering operations are performed. Typically, these rendering operations involve reading the results of prior rendering for a given pixel from the frame buffer, modifying the results based on the current operation, and writing the new values back to the frame buffer. For example, to determine if a particular pixel is visible, the distance from the pixel to the camera is often used. The distance for the current pixel is compared to the closest previous pixel from the frame buffer, and if the current pixel is visible, then the distance for the current pixel is written to the frame buffer for comparison with future pixels. Similarly, rendering operations that assign a color to a pixel often blend the color with the color that resulted from previous rendering operations. Operations in which a frame buffer value is read for a particular pixel, modified, and written back are generally referred to as R-M-W operations. Generally, rendering operations assign a color to each of the pixels of a display in accordance with the degree of coverage of the primitives comprising a scene. The per pixel color is also determined in accordance with texture map information that is assigned to the primitives, lighting information, and the like.

In many systems, the capability of performing R-M-W operations presents a hazard that must be overcome in the system design. In particular, many systems process multiple primitives concurrently. However, most graphics systems present the appearance that primitives are rendered in the order in which they are provided to the GPU. If two sequential primitives utilized R-M-W operations, then the GPU must give the appearance that the value that is written by the first primitive is the value read by the second primitive for any particular pixel. The hazard for the system is how to concurrently process primitives yet maintain the appearance of sequential processing as required by many graphics programming models (e.g. OpenGL or DirectX).

A variety of techniques exist to mitigate the R-M-W hazard depending on the application. A system may maintain a transaction log of the color updates required for a pixel. At the end of rendering a scene, the sorted transaction log may be used to create the final pixel color. Another common solution is referred to as a "scoreboard". A scoreboard is an array of memory that is used to indicate all of the screen locations where rendering of R-M-W operations may be occurring at any given time. When a primitive is rasterized, each pixel is checked against the scoreboard and is only rendered if no other pixel is currently rendering the same location. When rendering for a pixel begins, the scoreboard is marked for the pixel location. Upon completion of rendering, the scoreboard for a location is cleared. In this way, the system can render concurrently pixels in primitives which do not overlap pixels from other primitives, and will render serially any pixels in primitives which do overlap.

A problem exists however with the ability of prior art Scoreboard 3-D rendering architectures to function with the latency that occurs when accessing graphics memory. For example, as pixel fragments are updated in a graphics memory (e.g., frame buffer, etc.), an undesirable amount of latency is incurred as the scoreboard mechanism functions to mitigate the R-M-W hazards. As described above, depending on the specifics of individual systems, a large amount of this latency is due to the scoreboard checking of concurrently rendered pixels.

Thus, a need exists for a rasterization process that can scale as graphics needs require and provide added performance while reducing the impact of graphics memory access latency.

SUMMARY OF THE INVENTION

Embodiments of the present invention implement a rasterization process that can scale as graphics needs require and provide added performance while reducing the impact of graphics memory access latency.

In one embodiment, the present invention is implemented as a method for latency buffered scoreboarding in a graphics pipeline of a graphics processor. The method includes receiving a graphics primitive for rasterization in a raster stage of a graphics processor and rasterizing the graphics primitive to generate a plurality pixels related to the graphics primitive. An ID is stored and is used to account for an initiation of parameter evaluation for each of the pixels (e.g., when the pixels are sent down the pipeline) as the pixels are transmitted to a subsequent stage of the graphics processor. One or more buffers are used to store the resulting fragment data when the pixels emerge from the pipeline. The ID and the fragment data from the buffering are compared to determine whether they correspond to one another. The completion of parameter evaluation for each of the pixels is accounted for when the ID and the fragment data match and as the fragment data is written to a memory (e.g., L2 cache, graphics memory, or the like).

In one embodiment, the accounting for the initiation of parameter evaluation and the accounting for the completion of parameter evaluation comprises a scoreboarding process that is implemented by the graphics processor. This scoreboarding process can be implemented along with the buffering of the fragment data to compensate for latency in accessing the memory. In one embodiment, the accounting for the completion of parameter evaluation as provided by the scoreboarding process is configured to ensure coherency of the fragment data written to the memory. In one embodiment, the buffers for the fragment data comprise an L1 cache and the memory comprises an L2 cache.

In this manner, embodiments of the present invention provides for a rasterization process that can scale as graphics needs require and provide added performance while reducing the impact of graphics memory access latency. For example, pixel fragments can be updated in a graphics memory (e.g., L2 cache, frame buffer, etc.) while buffer memory compensates for any latency. These benefits can be provided as the scoreboard mechanism prevents R-M-W hazards.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
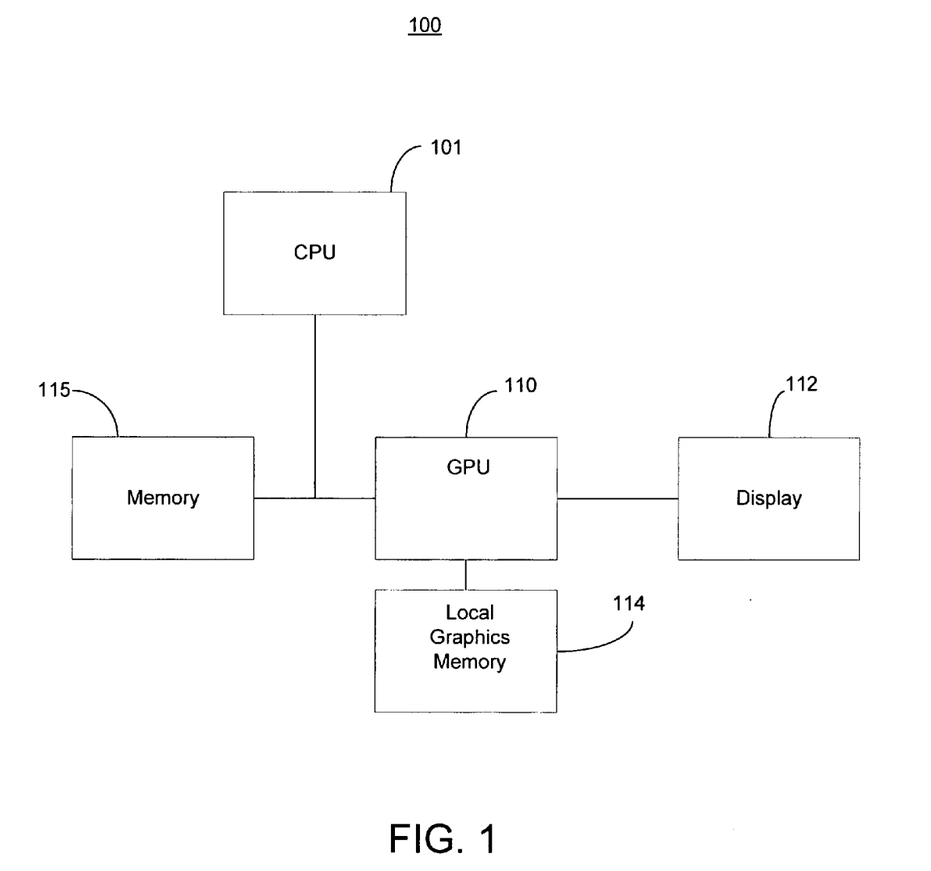
FIG. 1 shows a computer system in accordance with one embodiment of the present invention.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

Embodiments of the Invention

Embodiments of the present invention implement a method and system for latency buffered scoreboarding in a graphics pipeline of a graphics processor (e.g., GPU 110 of FIG. 1). The method includes receiving a graphics primitive (e.g., a triangle polygon) for rasterization in a raster stage of the GPU 110 and rasterizing the graphics primitive to generate a plurality of tiles of pixels (e.g., 16×16 pixel tiles, 8×8 pixel tiles, 2×2 pixel tiles, etc.) related to the graphics primitive. The scoreboarding includes accounting for an initiation of parameter evaluation for each of the plurality of tiles they are transmitted to a subsequent stage (e.g., shader, etc.) of the graphics pipeline and accounting for a completion of the parameter evaluation for each of the tiles as they complete processing in the subsequent stage. An ID stored to account for an initiation of parameter evaluation for each of the plurality of pixels as the pixels are transmitted to a subsequent stage of the graphics processor. A buffer is used to store the fragment data resulting from the parameter evaluation for each of the plurality of pixels by the subsequent stage. The ID and the fragment data from the buffering are compared to determine whether they correspond to one another. The completion of parameter evaluation for the pixels is accounted for when the ID and the fragment data match and as the fragment data is written to a memory (e.g., L2 cache, graphics memory, or the like). Embodiments of the present invention and their benefits are further described below.

Figure 2:
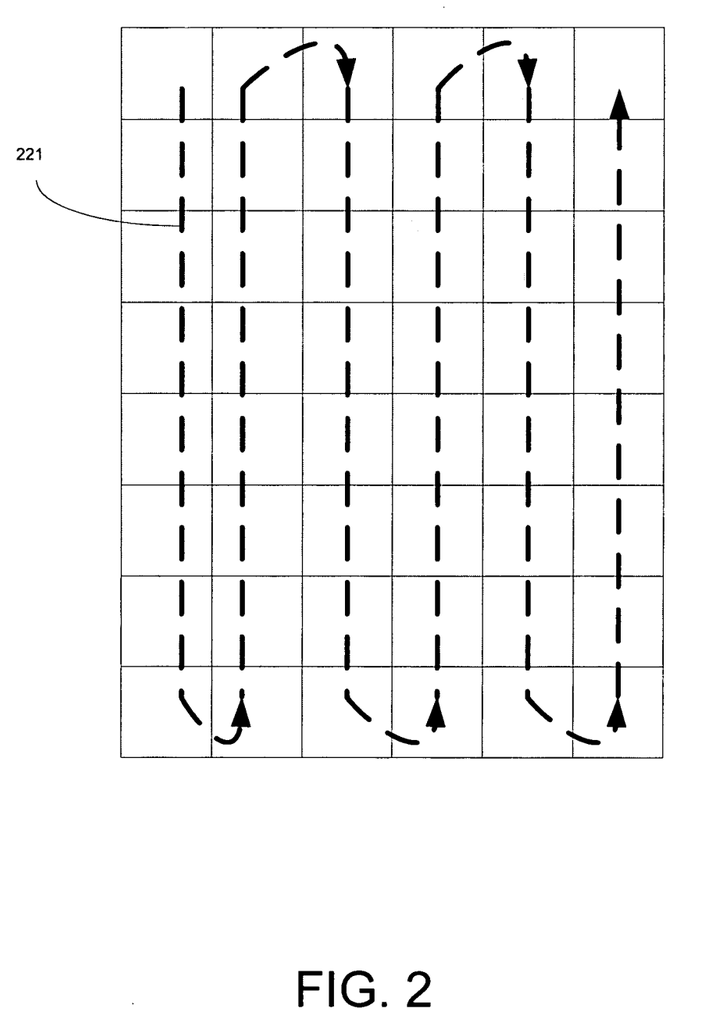
FIG. 2 shows a diagram depicting a grid of pixels being rasterized in a boustrophedonic pattern in accordance with one embodiment of the present invention.

FIG. 2 shows a diagram depicting a grid of pixels being rasterized using a traversal pattern 221 in accordance with one embodiment of the present invention. In one embodiment, as depicted in FIG. 2, a raster stage of the GPU 110 utilizes a traversal pattern for traversing a graphics primitive, as indicated by the dotted line 221. Each pixel of the grid of pixels is traversed in the order indicated, which in this case shows a boustrophedonic pattern of traversal, where the term "boustrophedonic" refers to a traversal pattern which visits all pixels on a 2D area by scanning back and forth along one axis as each pass moves farther along on the orthogonal axis, much as a farmer would plow or mow a field.

In the FIG. 2 example, the predominant axis is vertical. A vertical boustrophedonic sequence, for example, may generate all the pixels within a primitive triangle that are on one row from top to bottom, and then generate the next row bottom to top, and so on. However, it should be noted that the predominant axis can similarly be horizontal. Such a folded path ensures that an average distance from a generated pixel to recently previously generated pixels is relatively small. Additionally, it should be noted that the traversal pattern can be implemented on a tile-by-tile basis (e.g., from a generated tile to a recently previously generated tile) or on a pixel-by-pixel basis.

Figure 3:
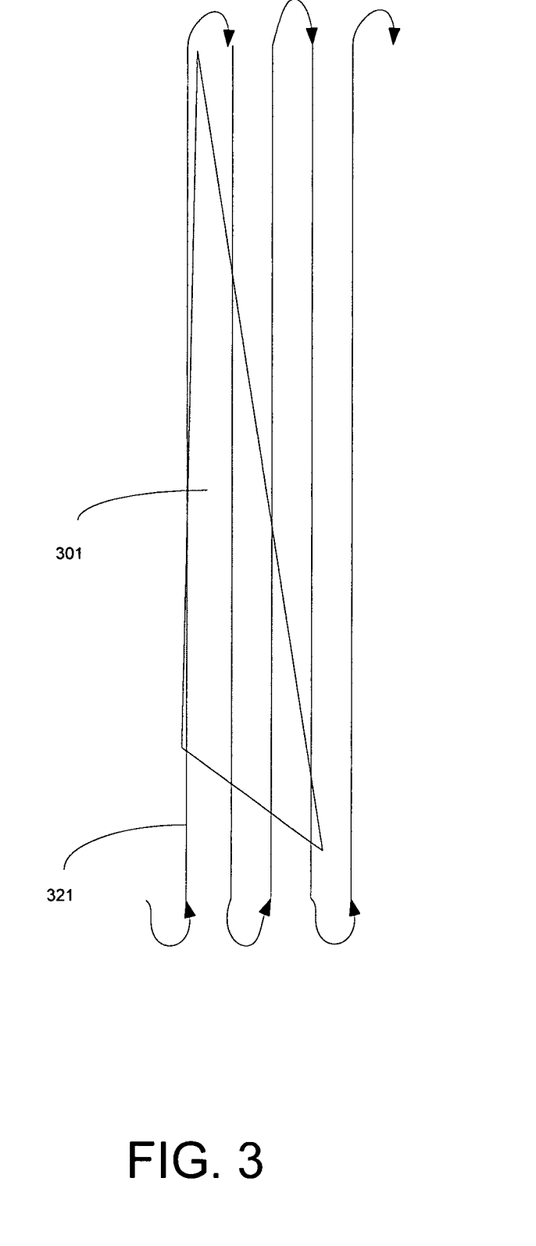
FIG. 3 shows a diagram of a triangle polygon against a rasterization pattern for a raster unit of a GPU in accordance with one embodiment of the present invention.
Figure 4:
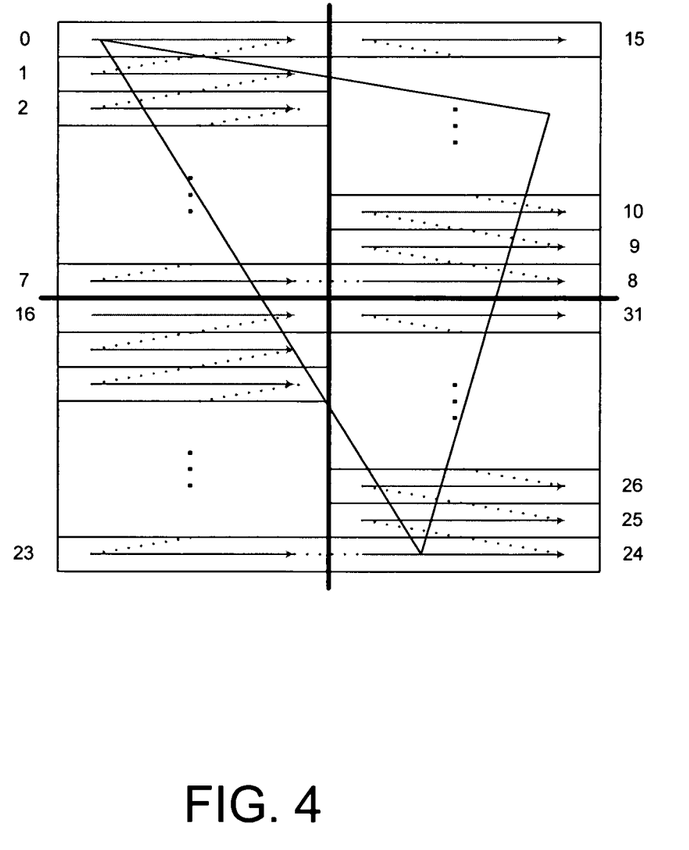
FIG. 4 shows a diagram of a second rasterization process for a triangle 401 in accordance with one embodiment of the present invention.

The traversal pattern 221 has advantages for maintaining a cache of relevant data and reducing the memory requests required for frame buffer access. For example, generating pixels that are near recently generated pixels is important when recent groups of pixels and/or their corresponding depth values, stencil values, and the like are kept in memories of a limited size (e.g., cache memories, etc.). FIGS. 3 and 4 show two exemplary boustrophedonic traversal patterns.

FIG. 3 shows a diagram of one rasterization process for a triangle 301 in accordance with one embodiment of the present invention. The line 321 shows a pattern of traversal where the raster unit visits all pixels on a 2D area of the triangle 301 by scanning along a vertical axis as each pass moves farther along on the orthogonal axis. A raster unit of the GPU 110 traverses the triangle 301 along the past 321 and stamps out tiles/pixels that have at least some coverage with respect to the triangle 301.

FIG. 4 shows a diagram of a second rasterization process for a triangle 401 in accordance with one embodiment of the present invention. The FIG. 4 embodiment shows a different pattern of traversal where the raster unit visits all tiles/pixels on a 2D area of the triangle 401 by sequentially scanning the lines of an upper left quadrant (e.g., lines 0 through 7), an upper right quadrant (e.g., lines 8 through 15), a lower left quadrant (e.g., lines 16 through 23), and a lower right quadrant (e.g., lines 24-31).

In each case (e.g., with triangle 301, triangle 401, etc.), an objective of the rasterization process is to determine which pixels have at least some degree of coverage by a given primitive. These pixels are then passed on to the subsequent stages of the graphics pipeline to be rendered into the appropriate fragment data and stored into the frame buffer memory for display.

Figure 5:
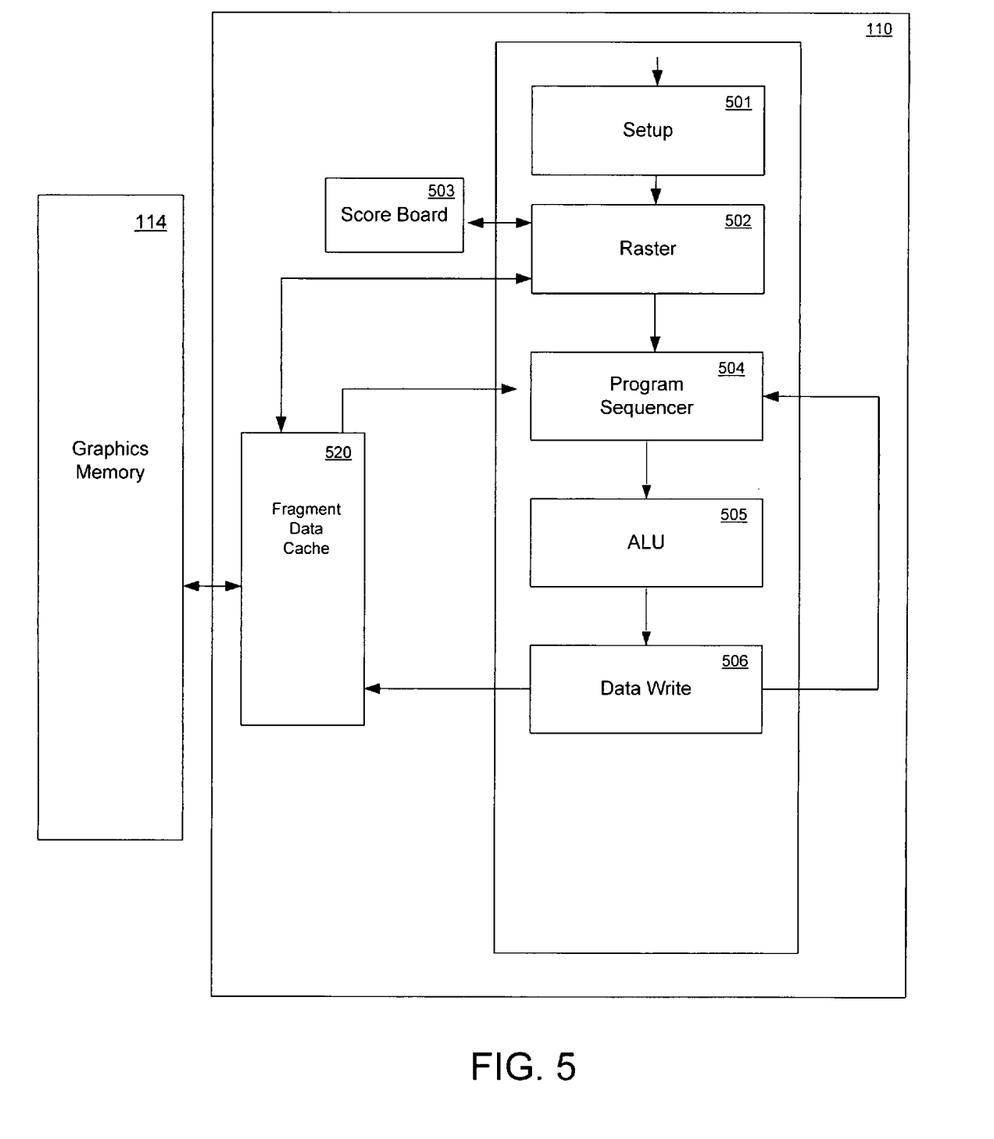
FIG. 5 shows a diagram depicting a graphics pipeline in accordance with one embodiment of the present invention.

FIG. 5 shows a diagram depicting a graphics pipeline in accordance with one embodiment of the present invention. The FIG. 5 embodiment illustrates exemplary internal components comprising a pipeline of the GPU 110. As shown in FIG. 5, the GPU 110 includes a setup unit 501 and a rasterizer unit 502. Generally, the set up unit 501 functions by converting descriptions based on vertices to descriptions based on edge descriptions. The rasterizer unit 502 subsequently converts these edge descriptions into filled areas comprising actual pixel descriptions (e.g., pixel areas, pixel sub-samples, etc.). The pixel descriptions are subsequently transmitted down the pipeline to other units within the GPU 110 for further processing and rendering.

The scoreboard unit 503 functions by accounting for the initiation of parameter evaluation for each of the pixels received from the raster unit 502. As pixels are emitted by the raster unit 502, the scoreboard unit 503 accounts for their processing initiation by using a scoreboard data structure (e.g., a scoreboard memory). As the raster unit 502 transmits pixels down the pipeline (e.g., to the program sequence or unit 504, etc.), it sets markers for the pixels into the scoreboard memory to account for the initiation of parameter evaluation. These markers (e.g., bits, flags, or the like) on the scoreboard signify that those respective pixels of the display have fragments "in-flight" within the graphics pipeline.

The in-flight marks of the scoreboard function by preventing read modify right hazards so that, for example, a subsequent primitive that rasterizes to the same pixels does not erroneously fetch stale data from graphics memory, caches, or the like. When a primitive is rasterized by the raster unit 502, each pixel is checked against the scoreboard 503 and is only launched down the pipeline if no other in-flight pixel is currently rendering the same location. Upon completion of rendering, the scoreboard for that location is cleared, thereby allowing concurrent rendering for pixels in primitives which do not overlap and serially rendering any pixels in primitives which do overlap.

The program sequencer 220 functions by controlling the operation of the functional modules of the graphics pipeline 210. The program sequencer 220 can interact with the graphics driver (e.g., a graphics driver executing on the CPU 101) to control the manner in which the functional modules (e.g., the ALU 505, etc.) of the graphics pipeline receive information, configure themselves, and process graphics primitives. The program sequencer 220 also functions by managing multiple pass rendering operations, where fragment data will loop around through the graphics pipeline two or more times (e.g., looping back from the data write unit 506) to implement, for example, more complex pixel shading, or the like.

The ALU unit 505 functions by performing parameter evaluation processing on the fragment data received from the raster unit 502 and the program sequencer 504. The parameter evaluation process can be one of the number of different evaluation processes, or pixel tests, which determine the degree to which the tiles from a given primitive influence pixel colors in the frame buffer 510. For example, the parameter evaluation process can be interpolation of primitive attributes, or a depth evaluation process, where, for example, depth values for the tiles passed from the raster unit 502 are tested against the depth values for those pixels are already residing within the frame buffer 510. Alternatively, the parameter evaluation process can be a transparency evaluation, where a transparency value for the tiles passed in raster unit are tested against the pixels already in the frame buffer. The objective is to identify pixels which will not ultimately be drawn in the frame buffer 510 and discard them to save processing bandwidth. For example, in a case where the parameter comprises a depth value, the objective is to identify those tiles which are behind other primitives, or are otherwise occluded, and discard them from the pipeline.

Once the ALU 505 completes operation on a pixel, the pixel is transmitted to the data write unit 506. The data write unit 506 writes the completed pixels to the fragment data cache 520. For multiple pass processing, data write unit 506 writes the fragment data back to the program sequencer 504.

The fragment data cache 520 functions by maintaining a high-speed cache memory for low latency access by the graphics pipeline. The fragment data cache 520 services read requests from the program sequencer 504, read and write requests from the raster unit 502, and data writes from the data write unit 506. The fragment data cache 520 is responsible for maintaining coherence between its internal caches and the graphics memory 114 (e.g., the frame buffer memory).

Figure 6:
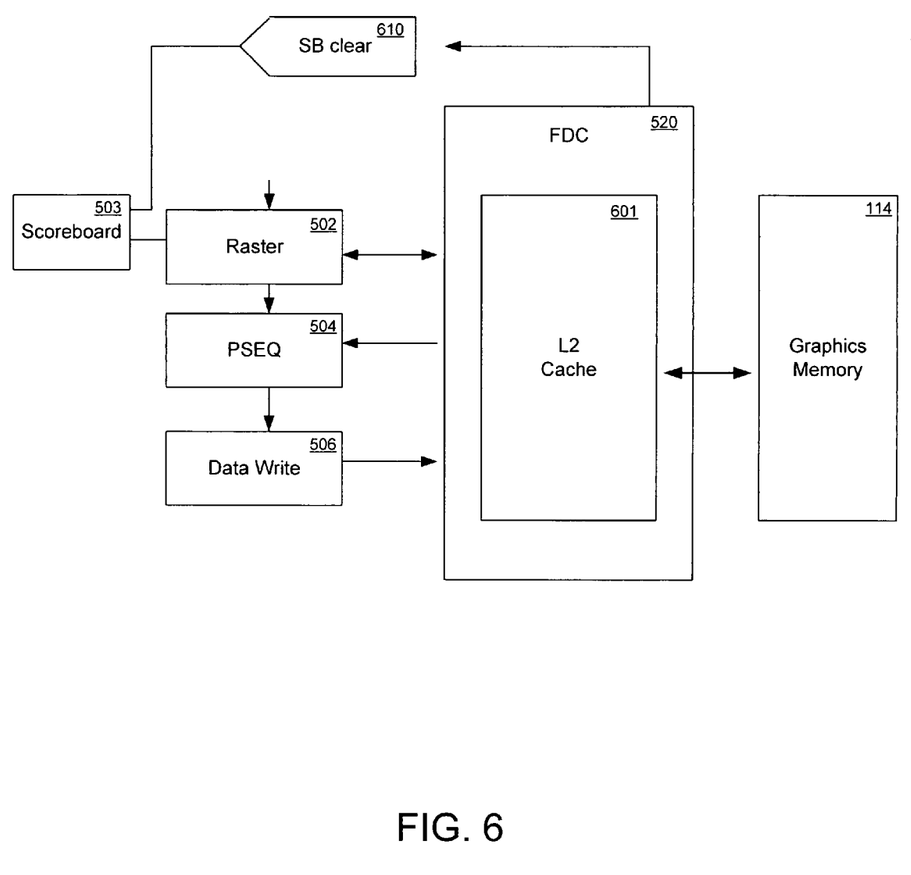
FIG. 6 shows a diagram depicting the communications relationship between the fragment data cache and other components of the GPU in accordance with one embodiment of the present invention.

FIG. 6 shows a diagram depicting the communications relationship between the fragment data cache 520 and other components of the GPU 110. As depicted in FIG. 6, the fragment data cache (e.g., FDC) services read and write requests from the raster unit 502. The fragment data cache 520 services read requests from the program sequencer 504. The fragment data cache 520 also services data writes from the data write unit 506. The fragment data cache 520 includes an internal L2 cache 601 and maintains coherence between the L2 cache 601 and a graphics memory 114. Additionally, the fragment data cache 520 ensures in-flight pixels only access coherent data from the L2 cache 601 when executing reads (e.g., the raster unit 502 or the program sequencer 504) or writes (e.g., the raster unit 502 or the data write unit 506). Additionally, as described above, the fragment data cache 520 is responsible for clearing the scoreboard 503 in order to maintain memory coherence and prevent read-modify-write hazards.

Figure 7:
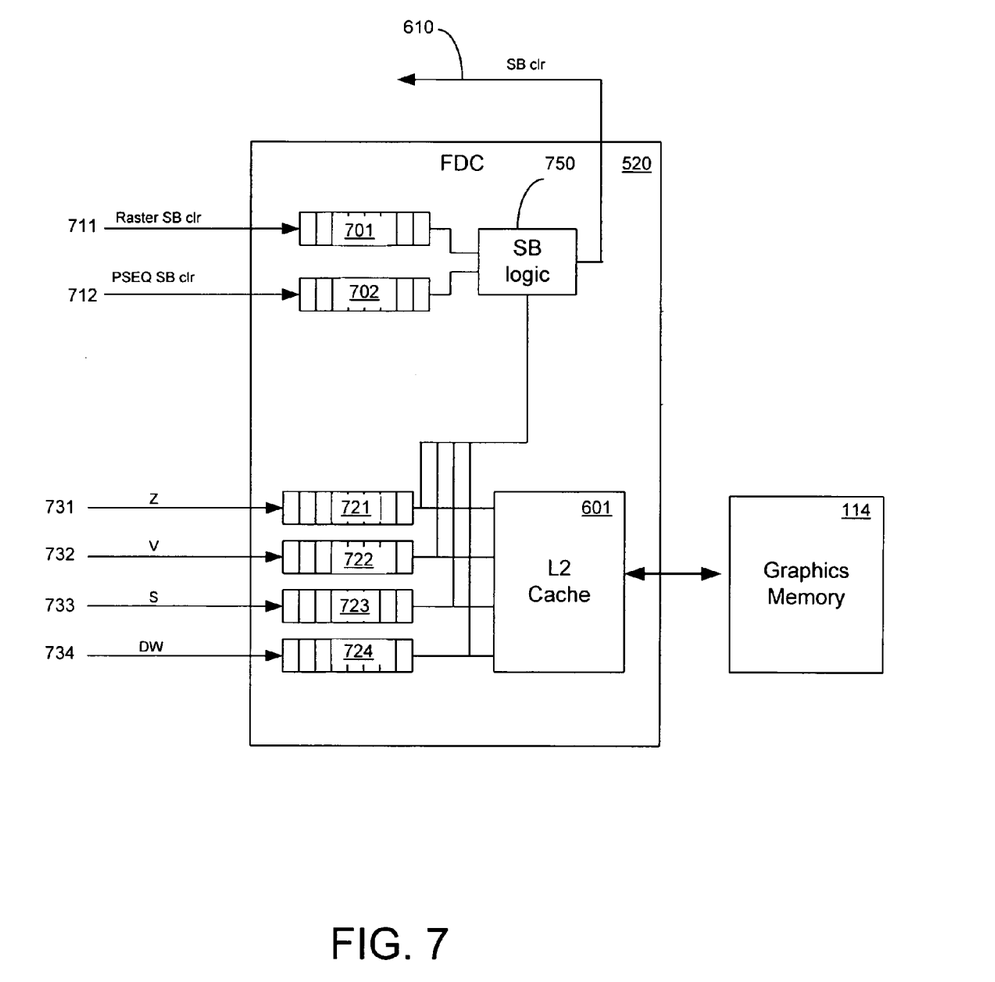
FIG. 7 shows a more detailed diagram depicting the fragment data cache 520 in accordance with one embodiment of the present invention.

FIG. 7 shows a more detailed diagram depicting the fragment data cache 520 in accordance with one embodiment of the present invention. As shown in FIG. 7, the fragment data cache 520 includes a scoreboard logic unit 750, the L2 cache 601, and a plurality of buffers 701-702 and 721-724.

The FIG. 7 embodiment shows the manner in which the fragment data cache 520 ensures coherency at the L2 cache 601. As described above, the fragment data cache 520 has two write clients, the raster unit 502 and the data write unit 506. The raster unit 502 writes three types of outputs 731-733 to the fragment data cache 520, in this case, depth information (e.g., z), virtual coverage anti-aliasing (e.g., v), and stencil information (e.g., s). The output 734 is from the data write unit 506 and comprises rendered fragment data. The outputs 731-734 are each buffered in dedicated buffers 721-724 as shown. In one embodiment, the buffers 721-724 comprise an L1 cache for the raster unit 502 and a data write unit 506. The buffers 721-724 function as FIFOs, where write pixel packets are received at the left and are emitted on the right. Upon output from the buffers 721-724, the write pixel packets are stored into the L2 cache 601 which is maintained coherently with the graphics memory 114.

As described above, as pixels are emitted by the raster unit 502, the scoreboard unit 503 is marked to account for their processing initiation, thereby signifying that those respective pixels of the display have fragments "in-flight" within the graphics pipeline. The raster unit 502 also stores an ID that corresponds to the mark within the scoreboard unit 503. This ID is referred to as a raster scoreboard clear packet and includes information that identifies the in-flight fragments that have just been launched. The raster scoreboard clear packet is transmitted from the raster unit 502 to the buffer 701 of the fragment data cache 520 as shown by line 711. In one embodiment, the identifying information is the x-y coordinate information of the pixel.

The FIG. 7 embodiment also shows a program sequencer scoreboard clear packet as shown by the line 712. The program sequencer 504 is configured to send scoreboard clear packets in order to insure coherence in those cases where fragment data performs multiple passes through the graphics pipeline (e.g., looping from the data write unit 506 back to the program sequencer unit 504). The program sequencer scoreboard clear packet is transmitted from the program sequencer unit 504 to the buffer 702 of the fragment data cache 520 as shown by line 712.

The scoreboard clear logic 750 functions by comparing the ID of the scoreboard clear packets 711 and/or 712 and the fragment data from the buffers 721-724. As fragment data packets are emitted from the buffers 721-724 and are stored into the L2 cache 601, those fragment data packets are compared against the IDs of the scoreboard clear packets in the buffers 701-702. The scoreboard clear signal 610 is held back while a determination is made as to whether these ID's (e.g., 711-712 vs 721-724) match. If they do not match, the scoreboard clear signal 610 is sent immediately. If they do match, the scoreboard logic 750 waits for the data to arrive at the L2 cache 601 before sending the scoreboard clear signal 610. This attribute is implemented due to the fact that some pixels which are cleared will not have data written at all to the fragment data cache 520, so if the scoreboard logic 750 waited for a match before sending the clear 610, the system could potentially lock up.

This signifies to the rest of the graphics pipeline that the pixels corresponding to the marker have finished processing and have been stored into the L2 cache 601. If the scoreboard clear logic 750 does not detect a match, it does not send the scoreboard clear signal 610 back to the scoreboard 503, which prevents the emission of any new coincident pixels from the raster unit 502. This attribute ensures coherence by preventing rasterized fragments that collide with outstanding IDs from entering the pipeline until the outstanding IDs are cleared in the scoreboard.

In this manner, the scoreboard unit 503 and the fragment data cache 520 enable the accounting for the initiation and the completion of pixel parameter evaluation to ensure a latency between a fetch of required parameter data and the modification and writeback of the parameter data by a subsequent stage of the graphics pipeline does not corrupt the rendering process.

It should be noted that the cache coherency attributes provided by the scoreboard unit 503 and the fragment data cache 520 are particularly useful in those architectures which do not have a dedicated ROP (render operations) hardware unit. For example, on an architecture that uses a streaming fragment processor for doing parameter evaluation, shader execution, and streaming processing, as well as the backend render operations, the cache coherency and read-modify-write hazard mitigation provided by the scoreboard unit 503 and the fragment data cache 520 enable a more efficient GPU design. Such a design would require fewer transistors and consume less power. These benefits can be particularly useful in, for example, battery-powered handheld device applications.

In one embodiment, the ID for the scoreboard clear packet comprises a hash of the corresponding fragment's frame buffer location. For example, when a fragment is emitted from the raster unit 502, the raster unit 502 sets a marker bit in the scoreboard 503 whose address in the scoreboard is a hash of that fragment's x-y frame buffer location. Additionally, the fragment packet is tagged if a bit was set in the scoreboard for it.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. In a graphics pipeline of a graphics processor, a method for latency buffered scoreboarding, comprising:
    receiving a graphics primitive for rasterization in a raster stage of a graphics processor;
    rasterizing the graphics primitive to generate a plurality pixels related to the graphics primitive;
    storing an ID to account for an initiation of parameter evaluation for each of the plurality of pixels as the pixels are transmitted to a subsequent stage of the graphics processor, wherein the ID is generated by a raster unit;
    buffering fragment data resulting from the parameter evaluation for each of the plurality of pixels by the subsequent stage;
    comparing the ID and the fragment data from the buffering;
    accounting for a completion of parameter evaluation, by using a scoreboard clear packet, for each of the plurality of pixels when the ID and the fragment data match and as the fragment data is written to a memory, wherein the scoreboard clear packet comprises information that identifies in-flight fragments that have just been launched, and wherein the scoreboard clear packet is an ID generated by the raster unit.

2. The method of claim 1, wherein the accounting for the initiation of parameter evaluation and the accounting for the completion of parameter evaluation comprises scoreboarding.

3. The method of claim 1, wherein the ID to account for the initiation of parameter evaluation is tracked in a scoreboard memory, wherein the ID is set to account for the initiation of parameter evaluation and the ID is cleared to account for the completion of parameter evaluation.

4. The method of claim 1, wherein the memory comprises an L2 cache.

5. The method of claim 1, wherein the accounting for the completion of parameter evaluation is configured to ensure coherency of the fragment data written to the memory by preventing a newly rasterized fragment from entering the graphics pipeline until processing of a prior coincident rasterized fragment is completed.

6. The method of claim 1, wherein the plurality of pixels comprise a grid of pixels and wherein each pixel of the grid of pixels is traversed in a boustrophedonic pattern of traversal.

7. A GPU (graphics processor unit), comprising:
    a set-up unit for generating polygon descriptions;
    a rasterizer unit coupled to the set-up unit for rasterizing the polygon descriptions;
    a scoreboard unit coupled to the rasterizer unit for accounting for an initiation of pixel parameter evaluation and accounting for a completion of pixel parameter evaluation;
    a fragment data cache for buffering fragment data resulting from the completion of pixel parameter evaluation, and wherein the fragment data cache ensures coherency by:
        buffering fragment data resulting from the parameter evaluation for each of a plurality of pixels by a subsequent stage;
        comparing an ID and the fragment data from the buffering, wherein the ID is stored to account for an initiation of parameter evaluation for each of the plurality of pixels as the pixels are transmitted to a subsequent stage of the graphics processor, wherein the ID is generated by a raster; and
        transmitting a completion signal, by using a scoreboard clear packet, indicating a completion of parameter evaluation for each of the plurality of pixels when the ID and the fragment data match and as the fragment data is written to a memory, wherein the scoreboard clear packet comprises information that identifies in-flight fragments that have just been launched, and wherein the scoreboard clear packet is an ID generated by the raster unit.

8. The GPU of claim 7, wherein the scoreboard unit comprises a scoreboard memory configured to account for the initiation of parameter evaluation and to account for the completion of parameter evaluation.

9. The GPU of claim 8, wherein the ID to account for the initiation of parameter evaluation is tracked in the scoreboard memory, wherein the ID is set to account for the initiation of parameter evaluation and the ID is cleared to account for the completion of parameter evaluation.

10. The GPU of claim 7, wherein the buffering of the fragment data compensates for a latency in accessing the memory.

11. The GPU of claim 7, wherein the memory comprises an L2 cache.

12. The GPU of claim 11, wherein the fragment data cache comprises an L1 cache.

13. The GPU of claim 12, wherein the accounting for the completion of parameter evaluation is configured to ensure coherency of the fragment data written to the L2 cache by preventing a newly rasterized fragment from colliding with a prior coincident rasterized fragment.

14. The GPU of claim 13, wherein the completion signal causes a clear of the ID to account for the initiation of the parameter evaluation tracked in the scoreboard memory.

15. A computer system, comprising:
a system memory;
a central processor unit coupled to the system memory; and
a graphics processor unit communicatively coupled to the central processor unit;
a set-up unit within the graphics processor unit for generating polygon descriptions;
a rasterizer unit within the graphics processor unit and coupled to the set-up unit for rasterizing the polygon descriptions;
a scoreboard unit coupled to the rasterizer unit for accounting for an initiation of pixel parameter evaluation and accounting for a completion of pixel parameter evaluation; and
a fragment data cache for buffering fragment data resulting from the completion of pixel parameter evaluation, and wherein the fragment data cache ensures coherency by:
buffering fragment data resulting from the parameter evaluation for each of a plurality of pixels by a subsequent stage;
comparing an ID and the fragment data from the buffering, wherein the ID is stored to account for an initiation of parameter evaluation for each of the plurality of pixels as the pixels are transmitted to a subsequent stage of the graphics processor, wherein the ID is generated by a raster unit; and
transmitting a completion signal, by using a scoreboard clear packet, indicating a completion of parameter evaluation for each of the plurality of pixels when the ID and the fragment data match and as the fragment data is written to a memory, wherein the scoreboard clear packet comprises information that identifies in-flight fragments that have just been launched, and wherein the scoreboard clear packet is an ID generated by the raster unit.

16. The computer system of claim 15, wherein the scoreboard unit comprises a scoreboard memory configured to account for the initiation of parameter evaluation and to account for the completion of parameter evaluation.

17. The computer system of claim 16, wherein the ID to account for the initiation of parameter evaluation is tracked in the scoreboard memory, wherein the ID is set to account for the initiation of parameter evaluation and the ID is cleared to account for the completion of parameter evaluation.

18. The computer system of claim 15, wherein the memory comprises an L2 cache and the fragment data cache comprises an L1 cache.

19. The computer system of claim 18, wherein the accounting for the completion of parameter evaluation is configured to ensure coherency of the fragment data written to the L2 cache by preventing a newly rasterized fragment from colliding with a prior coincident rasterized fragment.

20. The computer system of claim 19, wherein the completion signal causes a clear of the ID to account for the initiation of the parameter evaluation tracked in the scoreboard memory.

21. The computer system of claim 19, wherein a scoreboard clear signal is transmitted prevent emission of any new coincident pixels from the raster unit, to ensure coherence by preventing rasterized fragments that collide with outstanding IDs from entering the pipeline until the outstanding IDs are cleared in the scoreboard.

* * * * *